United States Patent
Goswami et al.

(10) Patent No.: US 8,352,077 B2
(45) Date of Patent: Jan. 8, 2013

(54) INERTIA SHAPING FOR HUMANOID FALL DIRECTION CHANGE

(75) Inventors: Ambarish Goswami, Fremont, CA (US); Seung-kook Yun, Cambridge, MA (US); Kangkang Yin, Beijing (CN); Yoshiaki Sakagami, Cupertino, CA (US)

(73) Assignee: Honda Motor Co., Ltd., Tokyo (JP)

( * ) Notice: Subject to any disclaimer, the term of this patent is extended or adjusted under 35 U.S.C. 154(b) by 547 days.

(21) Appl. No.: 12/610,872

(22) Filed: Nov. 2, 2009

(65) Prior Publication Data

US 2010/0161131 A1 Jun. 24, 2010

Related U.S. Application Data

(60) Provisional application No. 61/139,442, filed on Dec. 19, 2008.

(51) Int. Cl.
*G05B 19/402* (2006.01)

(52) U.S. Cl. .......................................... 700/263; 180/8.1

(58) Field of Classification Search .................. 700/263, 700/245, 253, 254, 255; 901/1, 46; 180/8.1, 180/8.5, 8.6; 318/567, 568.12, 568.22, 590, 318/591, 630, 632
See application file for complete search history.

(56) References Cited

U.S. PATENT DOCUMENTS

| | | | |
|---|---|---|---|
| 6,064,167 A | 5/2000 | Takenaka et al. | |
| 6,539,284 B2 * | 3/2003 | Nourbakhsh et al. | 700/245 |
| 6,902,015 B2 | 6/2005 | Furuta et al. | |
| 6,915,230 B2 | 7/2005 | Kawai et al. | |
| 6,969,965 B2 | 11/2005 | Takenaka et al. | |
| 7,053,579 B2 | 5/2006 | Moridaira | |
| 7,120,518 B2 | 10/2006 | Takenaka et al. | |
| 7,937,185 B2 * | 5/2011 | Zaier | 700/245 |
| 2005/0055131 A1 | 3/2005 | Mikami et al. | |
| 2005/0113973 A1 | 5/2005 | Endo et al. | |
| 2005/0234593 A1 | 10/2005 | Goswami et al. | |
| 2006/0243499 A1 | 11/2006 | Hosada | |
| 2007/0016329 A1 | 1/2007 | Herr et al. | |
| 2008/0133053 A1 | 6/2008 | Pratt et al. | |
| 2008/0249662 A1 | 10/2008 | Nakamura | |
| 2010/0070076 A1 * | 3/2010 | Zaier | 700/245 |

OTHER PUBLICATIONS

Abdallah, M., et al., "A Biomechanically Motivated Two-Phase Strategy for Biped Upright Balance Control," Proceedings of the 2005 IEEE, International Conference on Robotics and Automation, Barcelona, Spain, Apr. 2005, pp. 2008-2013.

(Continued)

*Primary Examiner* — Dalena Tran
(74) *Attorney, Agent, or Firm* — Fenwick & West LLP; Mark Duell

(57) ABSTRACT

A system and method is disclosed for controlling a robot that is falling down from an upright posture. Inertia shaping is performed on the robot to avoid an object during the fall. A desired overall toppling angular velocity of the robot is determined. The direction of this velocity is based on the direction from the center of pressure of the robot to the object. A desired composite rigid body inertia of the robot is determined based on the desired overall toppling angular velocity. A desired joint velocity of the robot is determined based on the desired composite rigid body inertia. The desired joint velocity is also determined based on a composite rigid body inertia Jacobian of the robot. An actuator at a joint of the robot is then controlled to implement the desired joint velocity.

18 Claims, 9 Drawing Sheets

OTHER PUBLICATIONS

Bullo, F., "Exponential Stabilization of Relative Equilibria for Mechanical Systems with Symmetries," Symposium on Mathematical Theory of Network and Systems, Jul. 1998, 4 pages.

Fujiwara, K. et al., "An Optimal Planning of Falling Motions of a Humanoid Robot," Proceedings of the 2007 IEE/RSJ International Conference on Intelligent Robots and Systems, Oct. 29-Nov. 2, 2007, pp. 456-462, San Diego, California, United States.

Fujiwara, K. et al., "UKEMI: Falling Motion Control to Minimize Damage to Biped Humanoid Robot," Proceedings of the 2002 IEEE/RSJ International Conference on Intelligent Robots and Systems, EPFL, Oct. 2002, pp. 2521-2526, Lausanne, Switzerland.

Kajita, S. et al., "Resolved Momentum Control: Humanoid Motion Planning based on the Linear and Angular Momentum," Proceedings of the 2003 IEEE/RSJ, International Conference on Intelligent Robots and Systems, Oct. 2003, pp. 1644-1650.

Kajita, S. et al., "Study of Dynamic Biped Locomotion on Rugged Terrain," Proceedings of the 1991 IEEE International Conference on Robotics and Automation, Apr. 1991, pp. 1405-1411.

Kajita, S. et al., "The 3D Linear Inverted Pendulum Mode: A simple modeling for a biped walking pattern generation," Proceedings of the 2001 IEEE/RSJ, International Conference on Intelligent Robots and Systems, Oct. 29-Nov. 3, 2001, pp. 239-246.

Komura, T. et al., "A Feedback Controller for Biped Humanoids that Can Counteract Large Perturbations During Gait," Proceedings of the 2005 IEEE International Conference on Robotics and Automation, Apr. 2005, pp. 1989-1995.

Komura, T. et al., "Animating Reactive Motions for Biped Locomotion," VRST 04, Nov. 10-12, 2004, 9 pages.

Komura, T. et al., "Simulating Pathological Gait Using the Enhanced Linear Inverted Pendulum Model," IEEE Transaction on Biomedical Engineering, Sep. 2005, pp. 1502-1513, vol. 52, No. 9.

Lee, S. et al., "Reaction Mass Pendulum (RMP): An Explicit Model for Centroidal Angular Momentum of Humanoid Robots," 2007 IEEE International Conference on Robotics and Automation, Apr. 10-14, 2007, pp. 4667-4672, Rome, Italy.

Mayer, N. et al., "Balanced Walking and Rapid Movements in a Biped Robot by Using a Symmetric Rotor and a Brake," 2006, 6 pages.

Park, J. H. et al., "Biped Robot Walking Using Gravity-Compensated Inverted Pendulum Mode and Computed Torque Control," Proceedings of the 1998 IEEE International Conference on Robotics & Automation, May 1998, pp. 3528-3533.

PCT International Search Report and Written Opinion, PCT Application No. PCT/US2009/067932, Feb. 4, 2010, 6 pages.

PCT International Search Report and Written Opinion, PCT Application No. PCT/US2009/068315, Feb. 5, 2010, 6 pages.

PCT International Search Report and Written Opinion, PCT Application No. PCT/US2009/067933, Mar. 2, 2010, 7 pages.

PCT International Search Report and Written Opinion, PCT Application No. PCT/US2007/085795, Jun. 19, 2008, 6 Pages.

PCT International Search Report and Written Opinion, PCT Application No. PCT/US2008/083935, Jan. 28, 2009, 6 Pages.

Pratt, J. et al., "Capture Point: A Step Toward Humanoid Push Recovery," Humanoids 2006, Dec. 2-4, 2006, 8 pages, Genoa, Italy.

Pratt, J. et al., "Velocity-Based Stability Margins for Fast Bipedal Walking," Fast Motions in Biomechanics and Robotics, 2006, Chapter 21, pp. 1-27, Springer Berlin, Heidelberg, Germany.

Rebula, J. et al., "Learning Capture Points for Humanoid Push Recovery," Proceedings of the 2007 IEEE-RAS International Conference on Humanoid Robots, Nov. 29-Dec. 1, 2006, 8 pages, Pittsburgh, Pennsylvania, USA.

Renner, R. et al., "Instability Detection and Fall Avoidance for a Humanoid Using Attitude Sensors and Reflexes," Proceedings of the 2006 IEEE/RSJ International Conference on Intelligent Robots and Systems, Oct. 9-15, 2006, pp. 2967-2973, Beijing, China.

Yamakita, M., et al., "Virtual Coupling Control for Dynamic Bipedal Walking," IEEE International Conference on Intelligent Robots and Systems, 2001, p. 233-238, vol. 1.

Yun, S. et al., "Safe Fall: Humanoid Robot Fall Direction Change Through Intelligent Stepping and Inertia Shaping," ICRA 2009, 7 pages, Kobe, Japan.

* cited by examiner

US 8,352,077 B2

INERTIA SHAPING FOR HUMANOID FALL DIRECTION CHANGE

CROSS-REFERENCE TO RELATED APPLICATION

This application claims the benefit of U.S. Provisional Application No. 61/139,442, filed Dec. 19, 2008, which is incorporated by reference in its entirety.

This application is related to co-pending U.S. application Ser. No. 12/610,865, filed on Nov. 2, 2009, entitled "Intelligent Stepping For Humanoid Fall Direction Change," by Ambarish Goswami et al., which is incorporated herein in its entirety by reference. This application is also related to co-pending U.S. application Ser. No. 11/946,702, filed Nov. 28, 2007, entitled "Determination of Foot Placement for Humanoid Push Recovery," which is incorporated herein in its entirety by reference.

BACKGROUND OF THE INVENTION

1. Field of the Invention

The present invention relates to controlling the motion of a robot.

2. Description of Background Art

Safety is a primary concern that should be addressed before humanoid robots can freely exist in human surroundings. Out of a number of possible situations where safety becomes an issue, one that involves a fall is particularly worrisome. A humanoid robot falling from an upright (e.g., standing or walking) posture can cause damage to delicate and expensive objects in the surroundings or injury to a nearby human being.

A humanoid robot fall may be caused due to unexpected or excessive external forces, unusual or unknown slipperiness, or the slope or profile of the ground. The fall may involve the robot slipping, tripping, or toppling. When the disturbances that threaten balance are larger than what the robot's balance controller can handle, the robot falls. Regardless of the substantial progress in humanoid robot balance control strategies, the possibility of a fall, however remote, remains real, even unavoidable. What is needed are techniques for reducing the damage to objects in the surroundings of a humanoid robot when the robot falls.

SUMMARY OF THE INVENTION

Embodiments of the invention provide techniques for controlling a robot that is falling down from an upright posture. Inertia shaping is performed on the robot to avoid an object during the fall. A desired overall toppling angular velocity of the robot is determined. The direction of this velocity is based on the direction from the center of pressure of the robot to the object. A desired composite rigid body inertia of the robot is determined based on the desired overall toppling angular velocity. A desired joint velocity of the robot is determined based on the desired composite rigid body inertia. The desired joint velocity is also determined based on a composite rigid body inertia Jacobian of the robot. An actuator at a joint of the robot is then controlled to implement the desired joint velocity.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION OF THE EMBODIMENTS

Figure 1A:
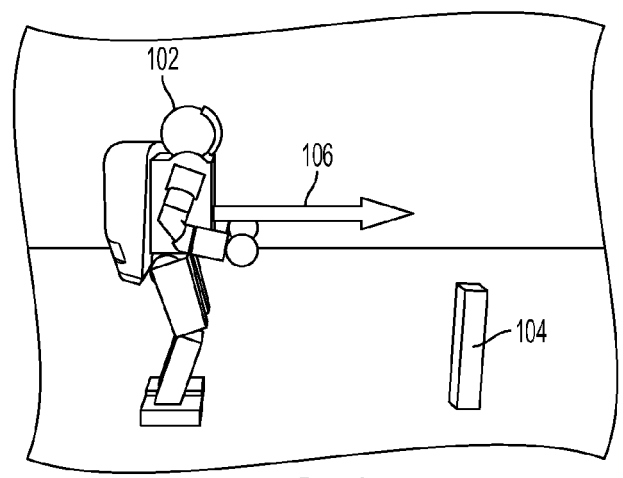
FIG. 1A illustrates a frontward push applied to an upright standing humanoid robot, in one embodiment.

A preferred embodiment of the present invention is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

Figure 1B:
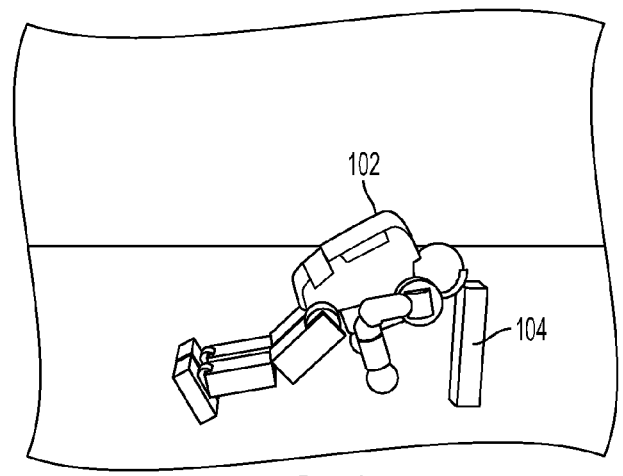
FIG. 1B illustrates the robot of FIG. 1A falling toward an object, in one embodiment.

FIG. 1A illustrates a frontward push 106 applied to an upright standing humanoid robot 102, in one embodiment. An object 104 is positioned in front of the robot 102. The object 104, can be inanimate (e.g., a block) or a living entity (e.g., a cat or a human child). Without any fall controller, the robot falls forward and hits the object 104, as illustrated in FIG. 1B. This may cause damage to both the robot and the object.

Figure 1C:
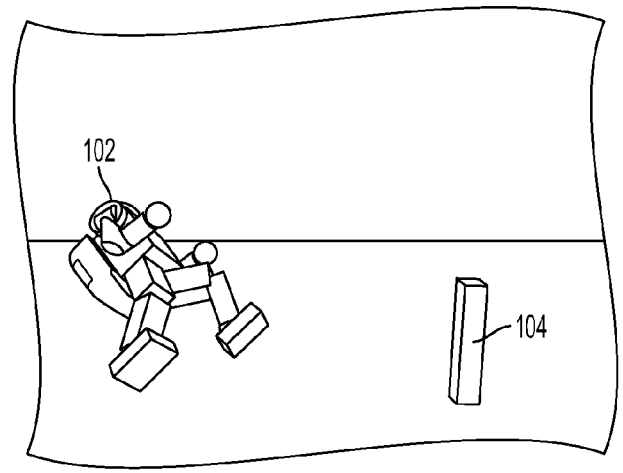
FIG. 1C illustrates the robot of FIG. 1A falling away from the object using a fall controller, in one embodiment.

In one embodiment, the robot 102 has a fall controller that enables the robot to fall with reduced damage to nearby objects or people. In certain situations, the fall controller can cause the robot to change its direction of fall by taking a step and/or using inertia shaping. FIG. 1C illustrates a fall of a robot 102 with a fall controller, in one embodiment. In FIG. 1C, the robot in FIG. 1A has taken a step and/or used inertia shaping to change its direction of fall, and has avoided hitting the object 104 as a result.

In one embodiment, a balance controller (e.g., a push-recovery controller) attempts to maintain or regain balance and avoid a fall. If the balance controller has failed to stabilize the robot, the fall controller is activated to control the direction of fall. The fall controller, further described below, takes over after the balance controller has failed. A fall detector may detect that the balance controller has failed and may activate the fall controller.

Figure 2:
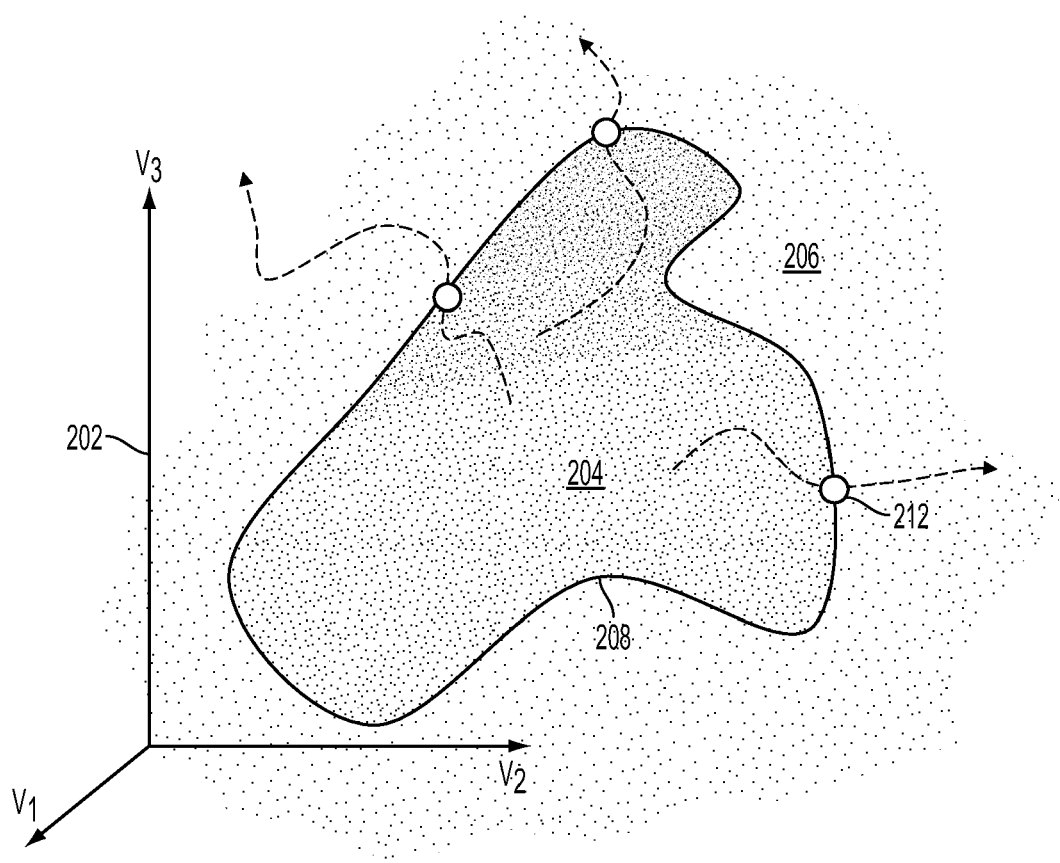
FIG. 2 illustrates a Fall Trigger Boundary (FTB) enclosing a region in a robot's feature space in which a balance controller is able to stabilize the robot, in one embodiment.

FIG. 2 illustrates a Fall Trigger Boundary (FTB) enclosing a region in a robot's feature space in which the balance controller is able to stabilize the robot, in one embodiment. The robot's feature space describes the state of the robot. A three-dimensional feature space is shown in FIG. 2, but generally the feature space can have number of dimensions. The axes 202 of FIG. 2 represent different robot parameters such as Center of Mass (CoM) coordinates, Center of Pressure (CoP) coordinates, robot lean angle, or angular momentum components. Some parameters can be computed from data provided by sensors located at various positions on the robot 102.

The balance control region 204 represents a portion of the feature space in which the balance controller is able to stabilize the robot. The fall region 206 represents the rest of the feature space in which the balance controller is not able to stabilize the robot and in which a fall is certain. These two regions are separated by the FTB 208. The shape and size of the FTB depends on the nature of the balance controller. An exit 212 through the FTB 208 is an indication of a certain fall and this event is used to activate a switch from the robot's balance controller to a fall controller.

Figure 3:
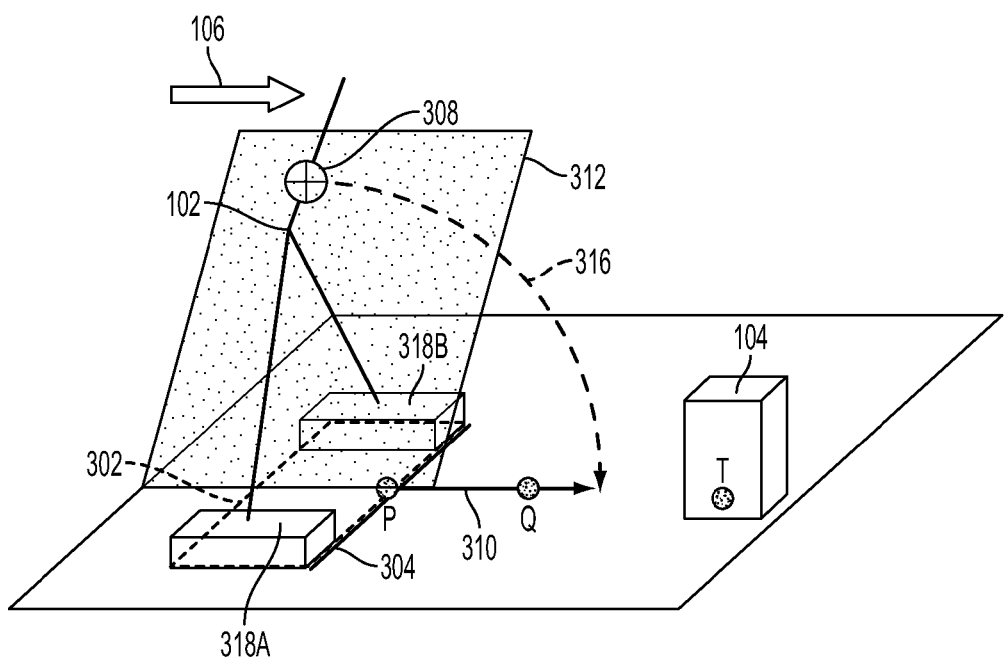
FIG. 3 illustrates a humanoid robot stick diagram subjected to a forward push, in one embodiment.

FIG. 3 illustrates a humanoid robot 102 subjected to a forward push 106. The robot 102 has a CoM 308, which is computed continuously, and two feet 318. The support base 302 (illustrated as a dotted polygon) is the convex hull of the contact points between the robot feet 318 and the ground. In one embodiment, the support base 302 is determined by finding the convex hull containing the vertices of the feet 318 of the robot using various known algorithms for efficiently finding the convex hull containing a set of points.

If the push 106 is strong enough to topple the robot 102, the CoP will approach and touch an edge (or corner) of the support base 302. As mentioned above, a push is not the only reason for a fall. The CoP will also approach and touch an edge (or corner) of the support base if the robot falls due to slipping or tipping. The CoP is the location of the resultant force on the feet from the ground and is always located within or on the perimeter of the support base. The direction of fall of a humanoid robot is determined based on the CoP location with respect to the support base 302. In FIG. 3, the point P is the CoP of the robot as it begins to topple in the direction of the push 106. As it begins falling, the robot 102 rotates about edge 304, referred to as the tipping edge or leading edge. If the CoP is touching a corner, the robot may instead rotate about a leading corner. The robot begins falling in a direction 310 perpendicular to the leading edge 304. The path of the CoM 308 of the robot as it falls is shown by dotted line 316 and is contained in plane 312. If no action is taken, the robot will fall on object 104.

In FIG. 3, the direction and magnitude of the toppling motion is given by PQ, where Q is a reference point. In one embodiment, the reference point Q is a capture point of the robot. Capture points are further described below. Although PQ may not be initially perpendicular to the leading edge 304 of the support base 302, it becomes so once the toppling motion begins (i.e., as the robot begins rotating about the leading edge).

In one embodiment, a fall controller of the robot causes the robot to take a step, resulting in a new leading edge 304 which results in the robot falling in a different direction and avoiding object 104. Another technique for modifying fall direction is referred to as "inertia shaping" and is further described below. In one embodiment, inertia shaping is performed after the robot has taken a step to modify fall direction. Alternatively, inertia shaping may be performed before or instead of taking a step.

In inertia shaping, the centroidal composite rigid body (CRB) inertia or the locked-inertia of the robot is controlled. Centroidal CRB inertia is the instantaneous rotational inertia of the robot if all its joints are locked. Unlike linear inertia, which is simply the robot's total mass, the CRB inertia is a function of the robot configuration and it varies continuously with the joint angles. Since a falling robot is normally under-actuated, direct control of the CoM is generally not effective. However, the fall direction can be changed by generating angular momentum against the direction of the target to be avoided. This can be done using inertia shaping.

The humanoid robot can be approximated as a reaction mass pendulum (RMP), which is a type of inverted pendulum with inertial mass. The RMP model is a three-dimensional (3D) generalization of the better known reaction or inertia wheel pendulum. The RMP model compactly captures the robot's centroidal momenta through its CRB inertia. The centroidal moment of inertia is a property of the distributed masses of the robot limbs (head, arms, legs, etc.) away from the CoM. A humanoid robot's state of balance is closely related to its rotational equilibrium which, in turn, is dependent on its angular momentum rate change. The centroidal moment of inertia directly contributes to the centroidal angular momentum and its rate of change. Direct manipulation of momenta can be used to control a robot, and the RMP model may be useful for such controllers.

Figure 4:
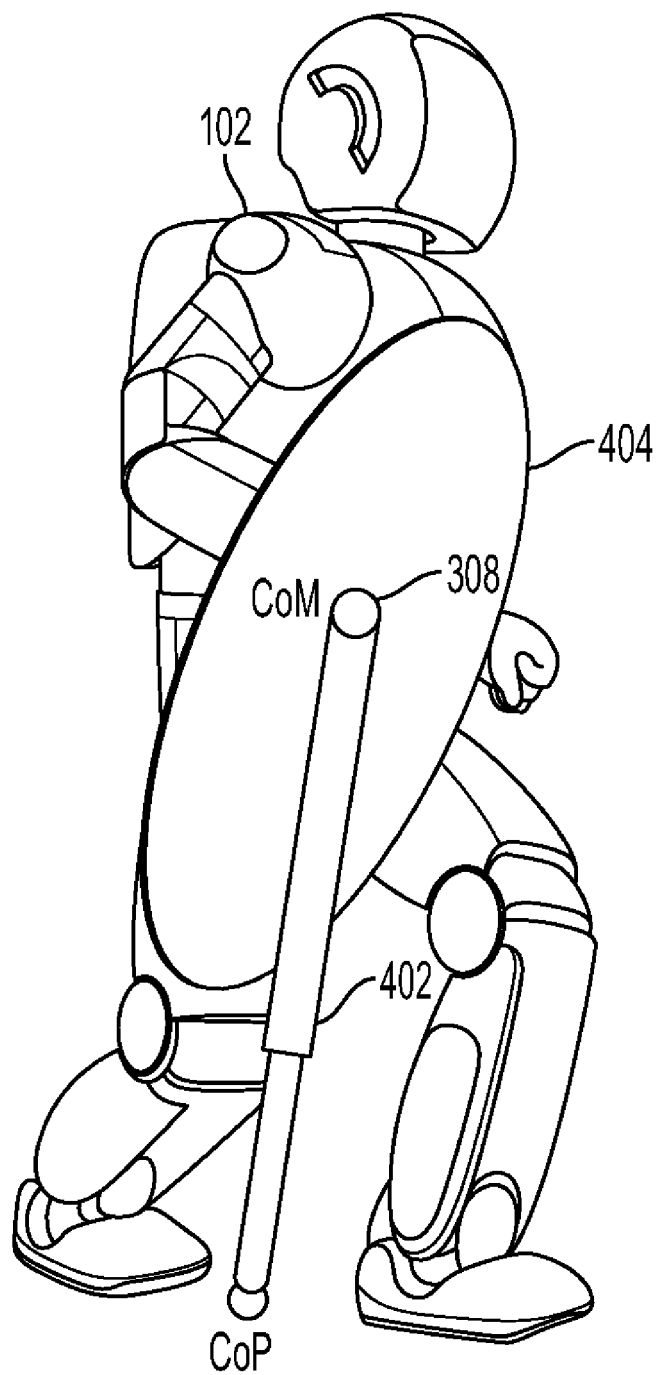
FIG. 4 illustrates reaction mass pendulum (RMP) model of a humanoid robot 102, in one embodiment.

FIG. 4 illustrates an RMP model of a humanoid robot 102. The RMP comprises two components: (1) a leg 402 that joins the CoP and the CoM, and (2) an ellipsoidal body 404, the abstracted reaction mass, that characterizes the centroidal CRB inertia of the entire robot projected at the CoM. As the robot 406 moves in space, so does the RMP, resulting in a continuous movement of the CoP and CoM. All limb movements of the robot affect its centroidal moment of inertia, which is captured by the changing shape, size, and orientation of the ellipsoidal reaction mass 404.

The RMP model of a humanoid robot is generated by developing the concept of centroidal CRB inertia of an articulated chain. A further description of an RMP model of a humanoid robot is given in the following publication, which is hereby incorporated by reference: "Reaction mass pendulum (RMP): An explicit model for centroidal angular momentum of humanoid robots," by S-H. Lee and A. Goswami, in IEEE International Conference on Robotics and Automation (ICRA), pages 4667-4672, April 2007.

Figure 5:
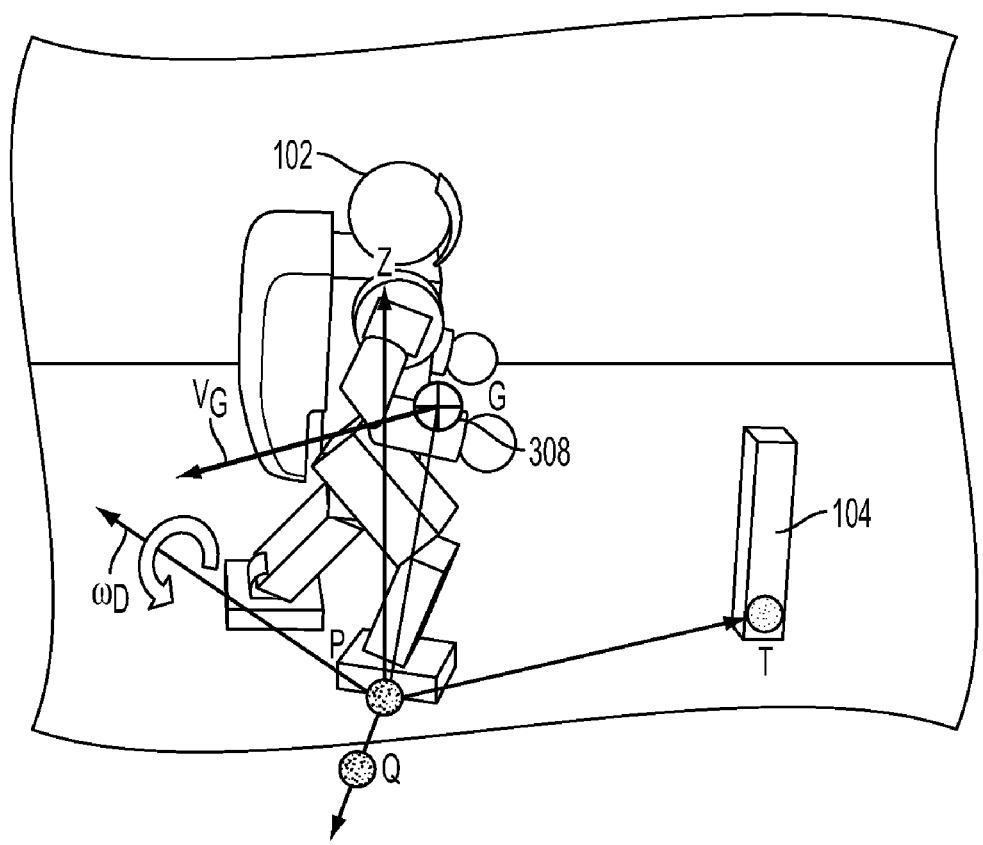
FIG. 5 illustrates a humanoid robot that is about to fall, in one embodiment.

FIG. 5 illustrates a humanoid robot 102 that is about to fall. FIG. 5 shows parameters corresponding to an approximation of the robot as an RMP, or an inverted pendulum with inertial mass, assuming no slip at the ground. G is the location of the CoM 308, P is the location of the CoP, T is the location of the object 104 on the ground, and $V_G$ is a vector representing the velocity of the CoM 308. Q is the location of a reference point. In one embodiment, the reference point is a capture point, where a capture point is the point on the ground where a robot can step to in order to come to a stopped state (e.g., a complete stop) after an external disturbance (e.g., a push). Capture points are further described in co-pending U.S. application Ser. No. 11/946,702, filed Nov. 28, 2007, which is incorporated by reference in its entirety.

If no further action is taken, the robot 102 in FIG. 5 will fall in the direction of PQ. Though the robot is not likely to hit object 104 if it falls in this direction, it is desirable to use inertia shaping to move the direction of fall even further from the object. Inertia shaping can cause the robot to have a desired angular velocity $\omega_d$ (shown in FIG. 5) which will cause the direction of fall to be further away from the object.

The CoM velocity $V_G$ can be computed as:

$$V_G = \omega_G^P \times PG \quad (1)$$

where $\omega_G^P$ is the angular velocity of the of the pendulum. It is desired to have $V_G = -cPT$ for some scalar c. In this case, the direction of fall would be opposite the direction of object 104. This can be achieved by setting the desired angular velocity of the robot $\omega_d$ as follows:

$$\omega_d = -e_{z \times PT} \quad (2)$$

where $e_{z \times PT}$ is a unit vector along the cross product between z (a vertical vector) and PT. As used here, the angular velocity of the robot is the overall toppling angular velocity of the robot. The desired locked inertia (i.e., the desired CRB inertia) is obtained as $I_d = RIR^{-1}$, where I is the current locked inertia and R is the rotation matrix obtained with an exponential map from $\omega_d$.

To implement inertia shaping, the 6 unique elements of the CRB inertia matrix are strung out in the form of a vector: $I_{(3\times 3)} \rightarrow \hat{I}_{(6\times 1)}$. The strung out vector form of $I_d$ is $\hat{I}_d$. Next, the CRB inertia Jacobian $J_I$ is determined. $J_I$ maps changes in the robot joint angles into corresponding changes in $\hat{I}$, i.e., $$\delta \hat{I} = J_I \delta \theta \quad (3)$$

where $\theta$ is a joint angle vector of the robot.

To attain $\hat{I}_d$, the desired joint velocities are:

$$\dot{\theta} = J_I^{\#}(\hat{I}_d - \hat{I}) \quad (4)$$

where $J_I^{\#}$ is the pseudo-inverse of $J_I$. The humanoid robot can recruit all the joints to attain $\hat{I}_d$. The effect of inertia shaping might not always be large enough to obtain the desired $V_G$, however, even a modest change is very useful.

Figure 6:
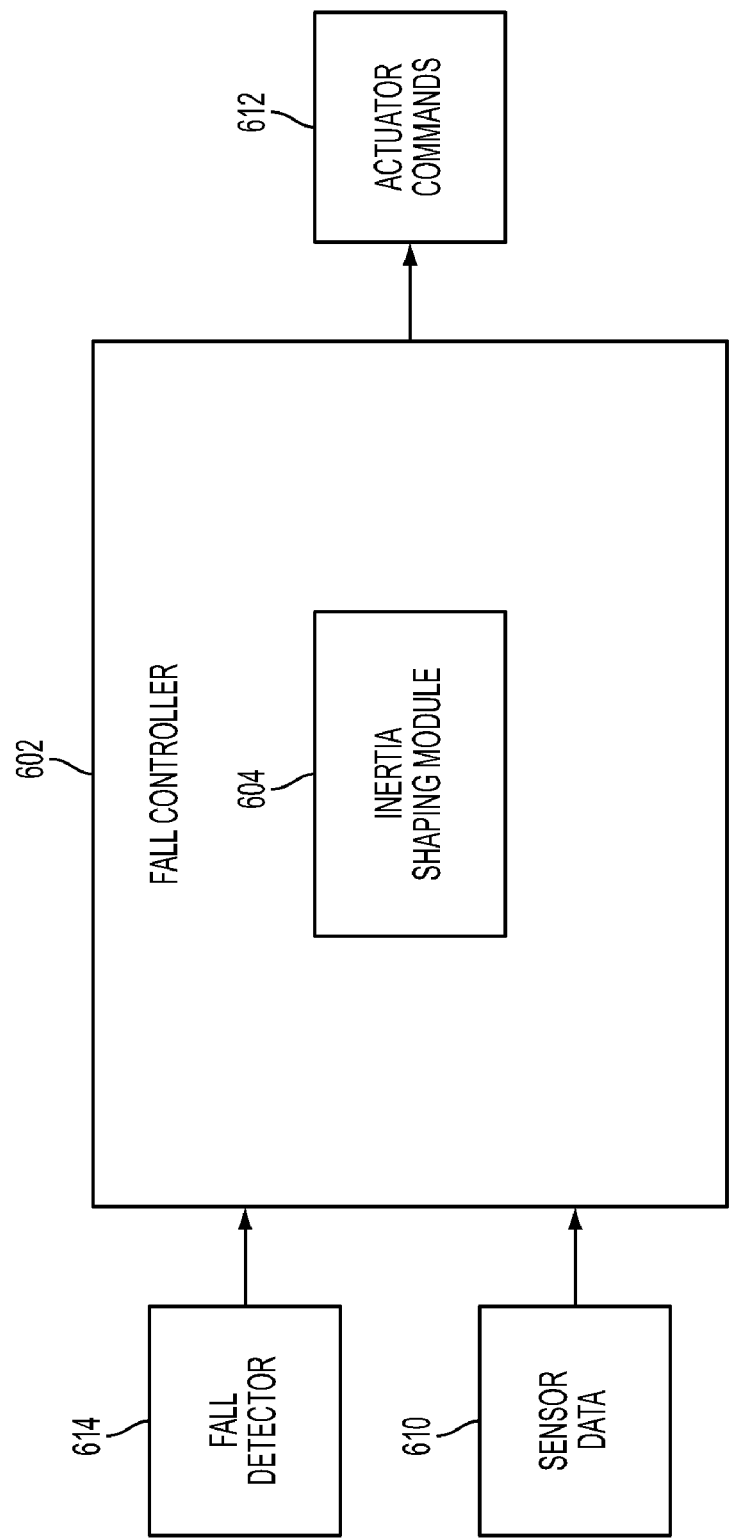
FIG. 6 is a block diagram illustrating a fall controller for controlling a robot during a fall, in one embodiment.

FIG. 6 is a block diagram illustrating a fall controller 602 for controlling a robot during a fall, in one embodiment. The fall controller enables the robot to change the direction of fall to reduce damage to the robot and to avoid hitting nearby objects or people. The fall controller 602 includes an inertia shaping module 604 which performs inertia shaping of the robot. The inertia shaping module is further discussed below. The fall controller receives input from a fall detector 614 and from sensor data 610 generated from sensors attached to the robot. For example, the fall detector 614 may indicate to the fall controller 602 that the robot is no longer able to maintain balance (e.g., has exited the FTB) and is about to fall. Upon receiving such an indication, the fall controller 602 can become active. Sensors can provide measurements such as joint angles and velocities. The fall controller issues actuator commands 612 to control the actuators in the robot. The actuators can implement the desired inertia shaping by causing the robot to move its joints according to the commands. In one embodiment, the fall controller 602 also includes modules (not shown) for controlling the robot to take a step to change its direction during a fall. The inertia shaping module 604 can be activated after those modules have caused the robot to take a step in order to further change the direction of fall.

Figure 7:
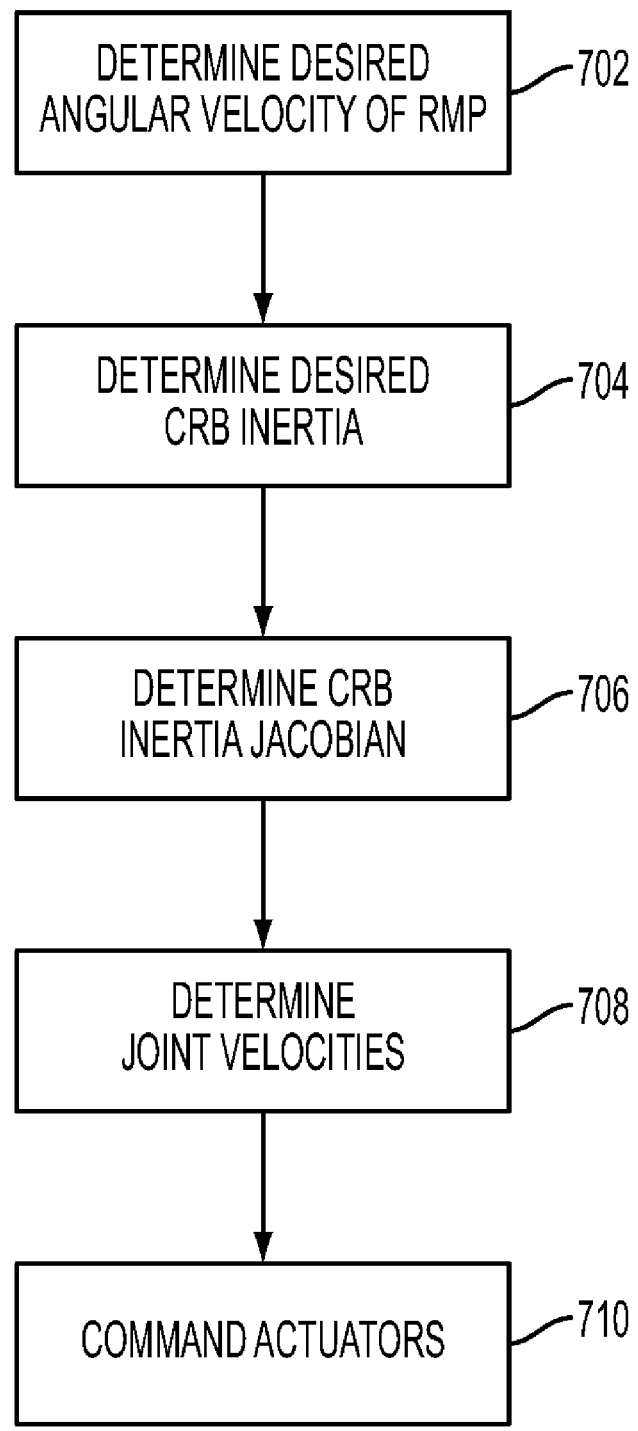
FIG. 7 is a flowchart illustrating a method for controlling a robot during a fall using inertia shaping, in one embodiment.

FIG. 7 is a flowchart illustrating a method for controlling a robot 102 during a fall using inertia shaping, in one embodiment. Once the inertia shaping module 604 has been activated, it determines 702 the desired angular velocity of the robot $\omega_d$ based on the location of the current CoP and object 104 to avoid. The inertia shaping module then determines 704 a desired locked inertia $\hat{I}_d$ (also referred to as a desired CRB inertia) based on the desired angular velocity of the robot. A CRB inertia Jacobian $J_I$ is determined 706 which maps changes in the robot joint angles into corresponding changes in the CRB inertia of the robot. The inertia shaping module 604 next determines 708 the desired joint velocities $\dot{\theta}$ for attaining the desired locked inertia $\hat{I}_d$. The desired joint velocities are calculated using the CRB inertia Jacobian $J_I$. The fall controller 602 commands 710 the actuators in the robot to cause the robot's joints to move according to the desired joint velocities $\dot{\theta}$.

Figure 8:
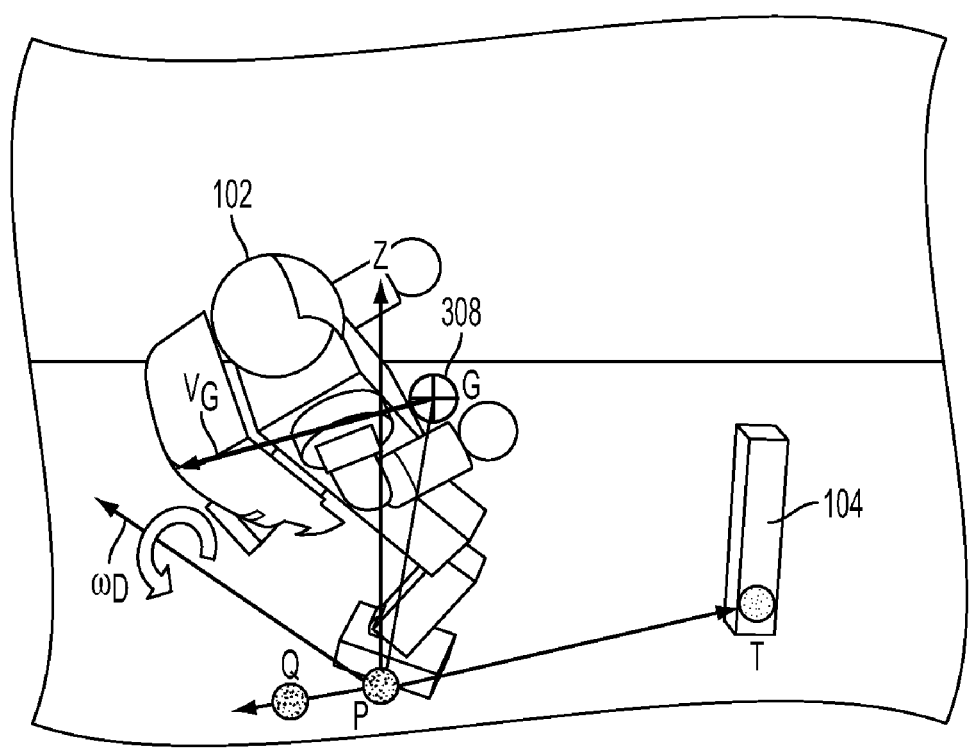
FIG. 8 illustrates the robot of FIG. 5 after performing inertia shaping, in one embodiment.

FIG. 8 illustrates the robot of FIG. 5 after performing inertia shaping. Various joint angles in the robot have changed according to commands from the fall controller 602 (e.g., the joint angle at the right knee of the robot). The inertia shaping has caused the robot to rotate around an axis obtained by the cross product of PT and the vertical vector (z). This has resulted in a new direction of fall PQ in nearly the opposite direction of the object 104.

Figure 9:
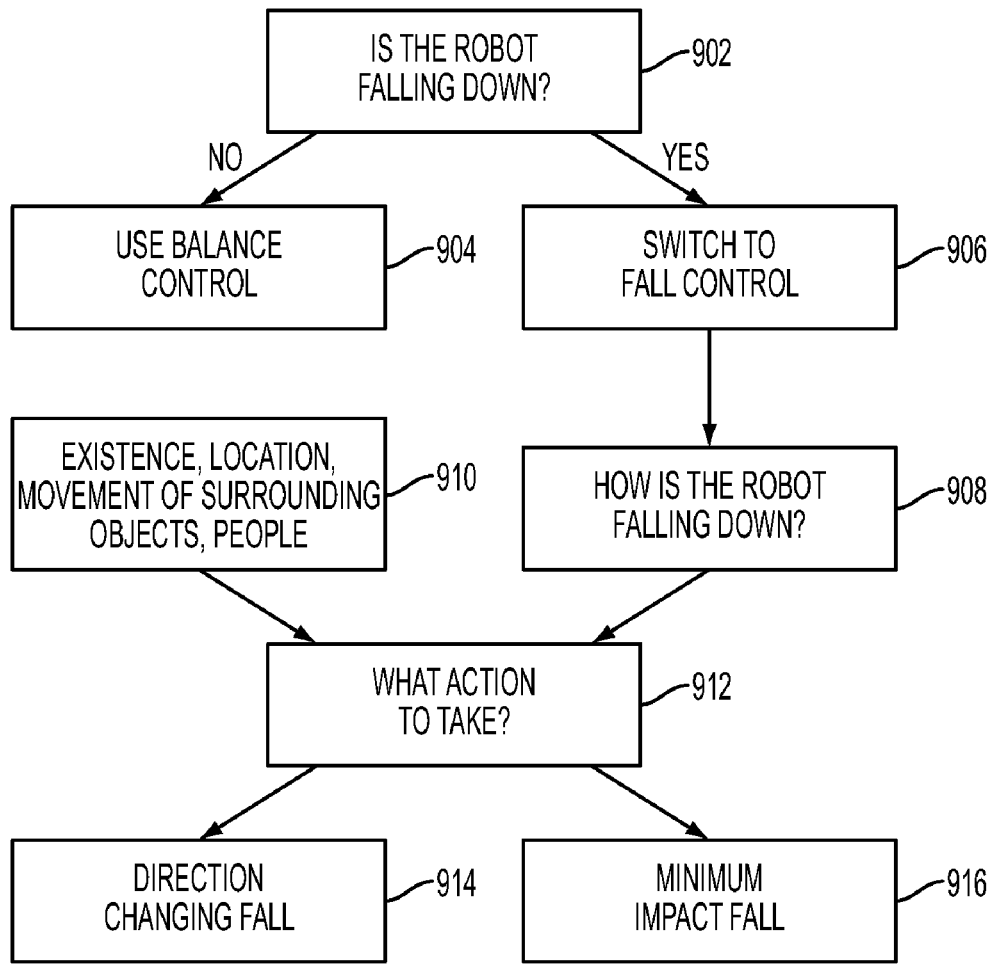
FIG. 9 is a flowchart illustrating a method for controlling a fall of a humanoid robot, in one embodiment.

FIG. 9 is a flowchart illustrating a method for controlling a fall of a humanoid robot, in one embodiment. In step 902, it is determined if the robot is falling down. If the robot is not falling down, balance control is used in step 904. If the robot is falling down, fall control is activated in step 906. In step 908, it is determined how the robot is falling down. This may include determining the lean angle, lean velocity, CoM location, CoM velocity, and whether one or both legs are touching the ground, for example. The amount of time remaining to take action before the fall can also be determined. In step 912, the next action to take is determined. This may be based on the outputs from step 908 or from various other factors 910. The factors 910 include the existence, location, and movement of surrounding objects or people. One action 914 to take is the change the direction of fall. This may involve changing the support base geometry of the robot of may involve performing inertia shaping. Another action 916 is to cause a minimum impact fall of the robot. For example, the robot may fall on its back or may learn and adopt favorable postures.

Although the invention has been described in considerable detail with reference to certain embodiments thereof, other embodiments are possible as will be understood to those skilled in the art.

What is claimed is:

1. A method performed by a computer system for controlling a robot, the robot falling down from an upright posture, the method comprising:
performing, by the computer system, inertia shaping on the robot for avoiding an object, comprising:
determining a desired overall toppling angular velocity of the robot, wherein a direction of the desired angular overall toppling velocity is based on a direction from a center of pressure of the robot to the object;
determining a desired composite rigid body inertia of the robot based on the desired overall toppling angular velocity of the robot; and
determining a desired joint velocity of the robot based on the desired composite rigid body inertia of the robot; and
controlling, by the computer system, an actuator at a joint of the robot to implement the desired joint velocity.

2. The method of claim 1, wherein the desired overall toppling angular velocity of the robot is perpendicular to the direction from the center of pressure of the robot to the object.

3. The method of claim 1, wherein the desired composite rigid body inertia of the robot is determined based on a current composite rigid body inertia of the robot and from a rotation matrix obtained with an exponential map.

4. The method of claim 1, further comprising:
determining a composite rigid body inertia Jacobian that maps changes in joint angles of the robot to changes in a composite rigid body inertia of the robot, and
wherein determining the desired joint velocity of the robot is based on the composite rigid body inertia Jacobian.

5. The method of claim 4, wherein determining the desired joint velocity of the robot is based on a pseudo-inverse of the composite rigid body inertia Jacobian.

6. The method of claim 1, further comprising:
determining a plurality of desired joint velocities of the robot based on the desired composite rigid body inertia; and
controlling a plurality of actuators at joints of the robot to implement the desired joint velocities.

7. A system for controlling a robot, the robot falling down from an upright posture, the system comprising:
a computer-readable storage medium storing executable computer program modules configured for:
performing inertia shaping on the robot for avoiding an object, comprising:
determining a desired overall toppling angular velocity of the robot, wherein a direction of the desired angular overall toppling velocity is based on a direction from a center of pressure of the robot to the object;
determining a desired composite rigid body inertia of the robot based on the desired overall toppling angular velocity of the robot; and
determining a desired joint velocity of the robot based on the desired composite rigid body inertia of the robot; and
controlling an actuator at a joint of the robot to implement the desired joint velocity.

8. The system of claim 7, wherein the desired overall toppling angular velocity of the robot is perpendicular to the direction from the center of pressure of the robot to the object.

9. The system of claim 7, wherein the desired composite rigid body inertia of the robot is determined based on a current composite rigid body inertia of the robot and from a rotation matrix obtained with an exponential map.

10. The system of claim 7, wherein the modules are further configured for:
determining a composite rigid body inertia Jacobian that maps changes in joint angles of the robot to changes in a composite rigid body inertia of the robot, and
wherein determining the desired joint velocity of the robot is based on the composite rigid body inertia Jacobian.

11. The system of claim 10, wherein determining the desired joint velocity of the robot is based on a pseudo-inverse of the composite rigid body inertia Jacobian.

12. The system of claim 7, wherein the modules are further configured for:
determining a plurality of desired joint velocities of the robot based on the desired composite rigid body inertia; and
controlling a plurality of actuators at joints of the robot to implement the desired joint velocities.

13. A non-transitory computer-readable storage medium storing computer-executable instructions for controlling a robot, the robot falling down from an upright posture, the instructions when executed causing a processor to perform steps including:

performing, by the computer system, inertia shaping on the robot for avoiding an object, comprising:
  determining a desired overall toppling angular velocity of the robot, wherein a direction of the desired angular overall toppling velocity is based on a direction from a center of pressure of the robot to the object;
  determining a desired composite rigid body inertia of the robot based on the desired overall toppling angular velocity of the robot; and
  determining a desired joint velocity of the robot based on the desired composite rigid body inertia of the robot; and
controlling, by the computer system, an actuator at a joint of the robot to implement the desired joint velocity.

14. The non-transitory computer-readable storage medium of claim 13, wherein the desired overall toppling angular velocity of the robot is perpendicular to the direction from the center of pressure of the robot to the object.

15. The non-transitory computer-readable storage medium of claim 13, wherein the desired composite rigid body inertia of the robot is determined based on a current composite rigid body inertia of the robot and from a rotation matrix obtained with an exponential map.

16. The non-transitory computer-readable storage medium of claim 13, further comprising:
  determining a composite rigid body inertia Jacobian that maps changes in joint angles of the robot to changes in a composite rigid body inertia of the robot, and
  wherein determining the desired joint velocity of the robot is based on the composite rigid body inertia Jacobian.

17. The non-transitory computer-readable storage medium of claim 16, wherein determining the desired joint velocity of the robot is based on a pseudo-inverse of the composite rigid body inertia Jacobian.

18. The non-transitory computer-readable storage medium of claim 13, further comprising:
  determining a plurality of desired joint velocities of the robot based on the desired composite rigid body inertia; and
  controlling a plurality of actuators at joints of the robot to implement the desired joint velocities.

* * * * *